United States Patent
Till

(10) Patent No.: US 7,200,975 B2
(45) Date of Patent: Apr. 10, 2007

(54) BEVERAGE BOTTLING PLANT FOR FILLING BOTTLES WITH A LIQUID BEVERAGE FILLING MATERIAL, HAVING A TRANSFER DEVICE FOR THE TRANSFER OF CONTAINERS FROM A TRANSFER STARWHEEL TO THE CAROUSEL OF A CONTAINER HANDLING MACHINE

(75) Inventor: Volker Till, Hofheim/Taunus (DE)

(73) Assignee: KHS Maschinen-und Anlagenbau AG, Dortmund (DE)

( * ) Notice: Subject to any disclaimer, the term of this patent is extended or adjusted under 35 U.S.C. 154(b) by 0 days.

(21) Appl. No.: 10/954,012

(22) Filed: Sep. 29, 2004

(65) Prior Publication Data

US 2005/0103399 A1 May 19, 2005

(30) Foreign Application Priority Data

Sep. 30, 2003 (DE) ............................... 103 45 317

(51) Int. Cl.
B65B 3/04 (2006.01)

(52) U.S. Cl. .................... 53/253; 53/111 RC; 53/167; 53/281; 53/300; 53/367; 198/441

(58) Field of Classification Search .......... 53/111 RC, 53/266.1, 415, 510, 167, 201, 282, 300, 253; 141/9, 101; 198/441
See application file for complete search history.

(56) References Cited

U.S. PATENT DOCUMENTS

| | | | |
|---|---|---|---|
| 3,975,260 A * | 8/1976 | Peyton et al. ................ 209/524 |
| 4,094,411 A * | 6/1978 | Kronseder et al. .......... 209/522 |
| 4,114,347 A * | 9/1978 | Morris et al. ................. 53/300 |
| 4,295,558 A * | 10/1981 | Heckmann .................... 198/367 |
| 4,467,908 A * | 8/1984 | Schneider .................... 198/441 |
| 4,721,200 A * | 1/1988 | Dugan ..................... 198/480.1 |
| 4,939,890 A * | 7/1990 | Peronek et al. ............... 53/486 |
| 5,261,207 A * | 11/1993 | Bedin ........................ 53/284.5 |
| 5,501,552 A * | 3/1996 | Simkowski ................... 406/52 |
| 5,713,403 A * | 2/1998 | Clusserath et al. ......... 141/101 |
| 5,732,528 A * | 3/1998 | Peronek et al. ............... 53/201 |
| 6,446,781 B1 * | 9/2002 | De Villele .................. 198/364 |
| 6,591,967 B1 * | 7/2003 | Doudement et al. ........ 198/450 |

FOREIGN PATENT DOCUMENTS

| DE | 103 26 618 A1 | 1/2005 |
|---|---|---|
| DE | 103 40 365 A1 | 3/2005 |

\* cited by examiner

Primary Examiner—Thanh Truong
(74) Attorney, Agent, or Firm—Nils H. Ljungman & Associates

(57) ABSTRACT

A beverage bottling plant for filling bottles with a liquid beverage filling material, having a transfer device for the transfer of containers from a transfer starwheel to the carousel of a container handling machine. A transfer device for container handling machines such as fillers, rinsers or cappers for the handling of containers with a neck ring, with a circulating carousel on which there are handling spaces for the container, with at least one infeed starwheel, whereby the transfer device comprises a rigid transfer arm and optionally a drive system to move the transfer arm back and forth.

20 Claims, 13 Drawing Sheets

BEVERAGE BOTTLING PLANT FOR FILLING BOTTLES WITH A LIQUID BEVERAGE FILLING MATERIAL, HAVING A TRANSFER DEVICE FOR THE TRANSFER OF CONTAINERS FROM A TRANSFER STARWHEEL TO THE CAROUSEL OF A CONTAINER HANDLING MACHINE

BACKGROUND

1. Technical Field

This application relates to a transfer device for container handling machines such as fillers, rinsers or cappers for the handling of containers with a neck ring, with a circulating carousel on which there are handling spaces for the container, with at least one infeed starwheel.

2. Background Information

A beverage bottling plant for filling bottles with a liquid beverage filling material can possibly comprise a beverage filling machine with a plurality of beverage filling positions, each beverage filling position having a beverage filling device for filling bottles with liquid beverage filling material. The filling devices may have an apparatus designed to introduce a predetermined volume of liquid beverage filling material into the interior of bottles to a substantially predetermined level of liquid beverage filling material. The apparatus designed to introduce a predetermined flow of liquid beverage filling material further comprises an apparatus that is designed to terminate the filling of the beverage bottles upon the liquid beverage filling material reaching the predetermined level in bottles. There may also be provided a conveyer arrangement that is designed to move bottles, for example, from an inspecting machine to the filling machine. Upon filling, a closing station closes the filled bottles. There may further be provided a conveyer arrangement configured to transfer filled bottles from the filling machine to the closing station. Bottles may be labeled in a labeling station, the labeling station having a conveyer arrangement to receive bottles and to output bottles. The closing station and the labeling station may be connected by a corresponding conveyer arrangement.

Thus, in one aspect, container handling machines comprise, for example, filling machines, closing machines, rinsers, and the like. In the case of increased production ratings, they are configured as rotatable arrangements and the handling positions that hold the containers are disposed at the circumference of the carousel and the positions move the containers during handling.

The transfer device that is an object of this application relates primarily to container handling machines for the handling of containers made of plastics such as PET, for example, such as bottles that are provided with a neck ring, for example. In addition, however, the present application also teaches the use of the transfer device for all other appropriate types of containers.

Container handling machines may include, for example, filling machines, capping machines, rinsers etc. At higher capacities, these machines may employ a rotating construction, whereby the handling spaces that receive the containers may be located on the periphery of a carousel and may carry along the containers in circulation during the handling.

Plastic containers provided with a neck ring, when they are empty or are inside the handling machine, may then be handled and/or transported generally by what may be called neck handling.

As a rule, the containers may be delivered to the handling machines by devices of the prior art for the transfer of such containers by air. Inside the handling machines, the containers may be transported by means of transfer or transport starwheels which can be specially designed for the handling of containers provided with a neck ring.

In other words, the containers may be held by the neck and may be carried through the air, rather than sitting on a conveyor device to be delivered to the transport starwheels. Such a method of conveying the bottles may help prevent bottles from falling and breaking.

The transfer of the containers by air, in which the containers may be transported in an unorganized fashion and without any fixed spacing to the transfer or transport starwheels, which may transport the containers in an organized fashion and at fixed intervals, using infeed or spacing screw conveyors of the prior art which can separate the containers that may be all piled up after being delivered by the air transport system, space them at the appropriate intervals and then feed them to a transfer or transport starwheel.

The next step may be the transfer of the containers by a transfer starwheel to the carousel or handling machine.

The constructive configurations necessary to achieve this objective can be determined to a major extent by the manner in which the containers can be held in position as they circulate with the carousel of the handling machine.

If the containers may be held in position by grippers, for example, that grip said containers in the vicinity of their mouths or on the neck rings, the transport or infeed starwheels generally can have corresponding grippers, whereby the containers may be transferred from the infeed starwheel to the carousel essentially at the apparent point of contact of the two reference circles. The release by the infeed starwheel and the fixing in position by the carousel can be thereby chronologically and spatially coordinated with each other so that the transfer may be secure, fast and reliable.

If the containers can be held in position by grippers that grip the body of the containers, the infeed starwheels generally may not have any gripper elements, but starwheel pockets that may first guide the containers securely with assistance from external guides and then deliver the containers to the grippers.

A first disadvantage of the devices described above may be the large number of components required and the associated high manufacturing and maintenance costs.

In particular for cold-aseptic bottling, which continues to gain market share, such devices can be afflicted with an additional essential disadvantage, which may be that it takes a great deal of effort and expense to keep such devices sterile in continuous operation.

To resolve this problem and others, the applicant has filed applications in Germany, e.g. Federal Republic of Germany Application Nos. 103 40 365.5, 103 42 415.6 and 103 26 618.6, which relate primarily to cold-aseptic container handling machines and may therefore be concerned with, among other things, reducing the number of components and reducing the size of the necessary clean room. Federal Republic of Germany Application Nos. 103 40 365.5, 103 42 415.6 and 103 26 618.6 are hereby incorporated by reference as if set forth in their entirety herein.

OBJECT OR OBJECTS

An object of this invention is to create a transfer device for the transfer of containers from a transfer starwheel to the carousel of a container handling machine, in particular but not exclusively for container handling machines as described in the above referenced applications which reliably avoids the above mentioned disadvantages. This application teaches that this transfer device comprises a simple guide element. In an additional, independent configuration of the present application, this guide element is movable.

To the best of the applicant's knowledge, no such devices are disclosed in the prior art.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The embodiments are explained in greater detail below with reference to the exemplary embodiments illustrated in the accompanying drawings, in which.

DESCRIPTION OF EMBODIMENT OR EMBODIMENTS

Developments, advantages and potential applications of the embodiments are described below with reference to the exemplary embodiments illustrated in the accompanying drawings. All the features described and/or illustrated are the object of the present application, individually or in any possible combination, regardless of their placement in the claims or the references to other claims. The content of the claims is also an integral part of the description and is hereby incorporated by reference.

Figure 1:
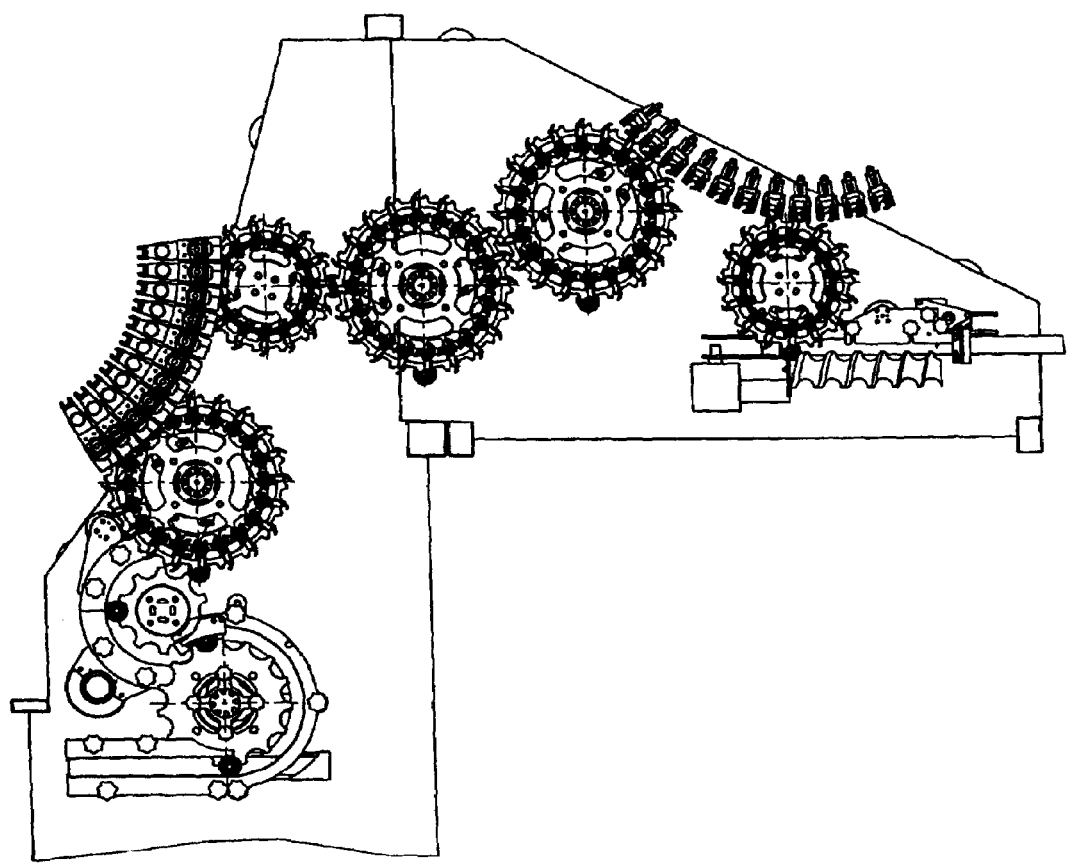
FIG. 1 shows in a greatly simplified overview two container handling machines which are connected to each other by infeed, discharge and transport starwheels, whereby all the illustrated components are part of the prior art.
Figure 1A:
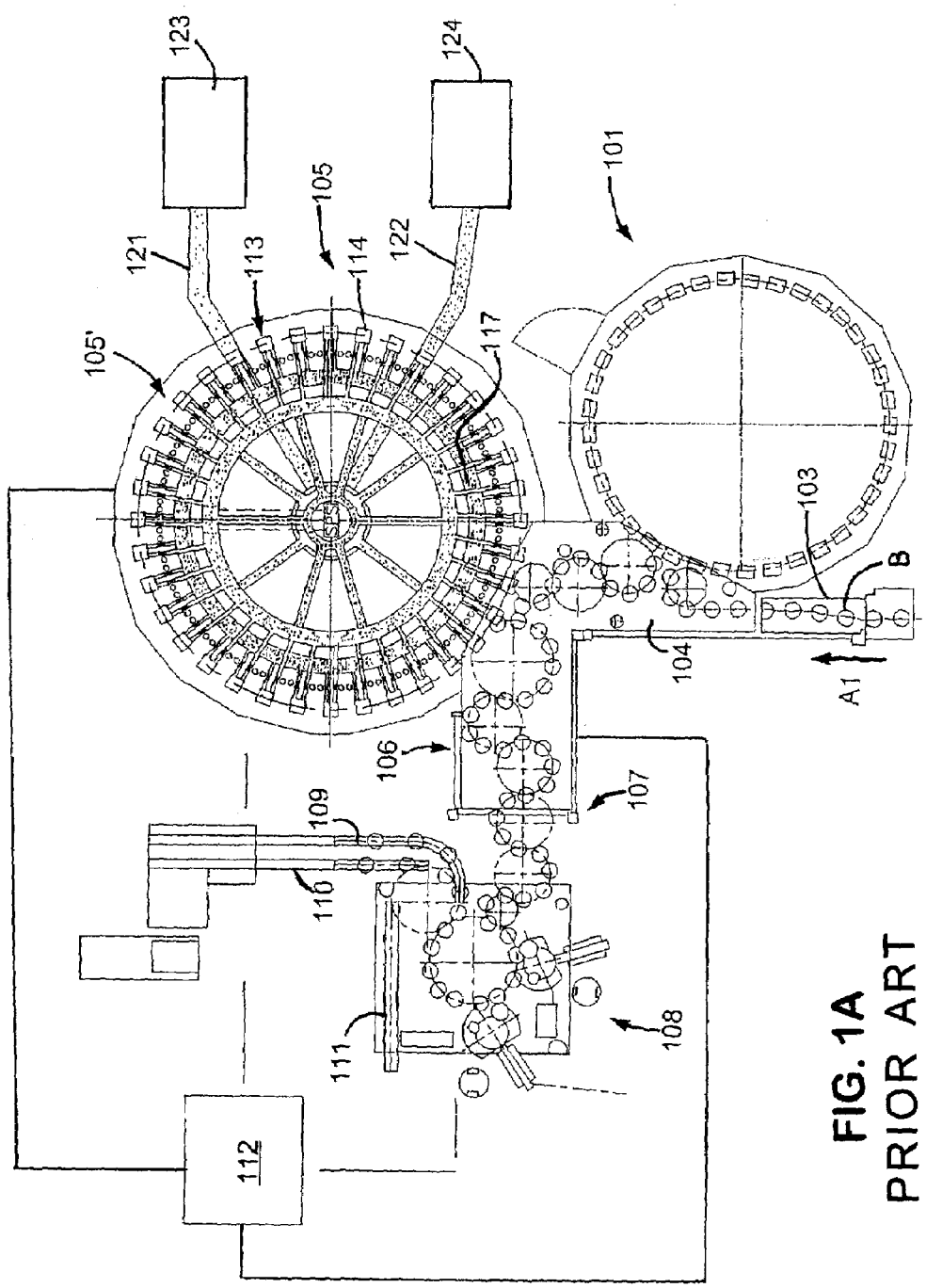
FIG. 1A is a schematic illustration of a container filling plant in accordance with one possible embodiment.

FIG. 1A shows schematically the main components of one embodiment example of a system for filling containers, specifically, an embodiment of a beverage bottling plant 100 for filling bottles B with liquid beverage filling material, in accordance with one embodiment, or in which system or plant could possibly be utilized at least one aspect, or several an aspects, of the embodiments disclosed herein.

FIG. 1A shows a rinsing arrangement or rinsing station 101, to which the containers, namely bottles B, are fed in the direction of travel as indicated by the arrow A1, by a first conveyer arrangement 103, which can be a linear conveyor or a combination of a linear conveyor and a starwheel. Downstream of the rinsing arrangement or rinsing station 101, in the direction of travel as indicated by the arrow A1, the rinsed bottles B are transported to a beverage filling machine 105 by a second conveyer arrangement 104 that is formed, for example, by one or more starwheels that introduce bottles B into the beverage filling machine 105.

The beverage filling machine 105 shown is of a revolving or rotary design, with a rotor 105', which revolves around a central, vertical machine axis. The rotor 105' is designed to receive and hold the bottles B for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles B to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle B, the first product or the second product can be filled by means of an appropriate control of the filling product or fluid valves.

Figure 8:
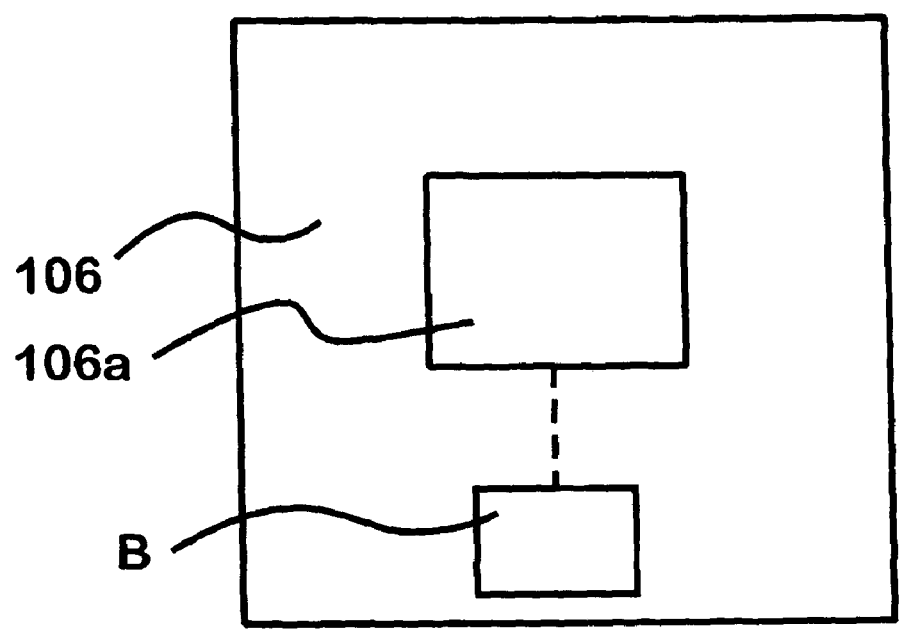
FIG. 8 is a box diagram showing a bottle closing or capping machine with a closing or capping device for applying closures or caps to a bottle.

Downstream of the beverage filling machine 105, in the direction of travel of the bottles B, there can be a beverage bottle closing arrangement or closing station 106 which has a plurality of closing devices 106a to close or cap the bottles B (see FIG. 8). The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles B. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles B to different locations.

The first output conveyer arrangement 109, in the embodiment shown, is designed to convey bottles B that are filled with a first type of liquid beverage supplied by, for example, the supply reservoir 123. The second output conveyer arrangement 110, in the embodiment shown, is designed to convey bottles B that are filled with a second type of liquid beverage supplied by, for example, the supply reservoir 124. The third output conveyer arrangement 111, in the embodiment shown, is designed to convey incorrectly labeled bottles B. To further explain, the labeling arrangement 108 can comprise at least one beverage bottle inspection or monitoring device that inspects or monitors the location of labels on the bottles B to determine if the labels have been correctly placed or aligned on the bottles B. The third output conveyer arrangement 111 removes any bottles B which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

It will be understood that while a two-product assembly or system of a bottling plant is illustrated in FIG. 1A, the disclosure is equally applicable to single-product installations, or other commensurate embodiments.

Figure 1B:
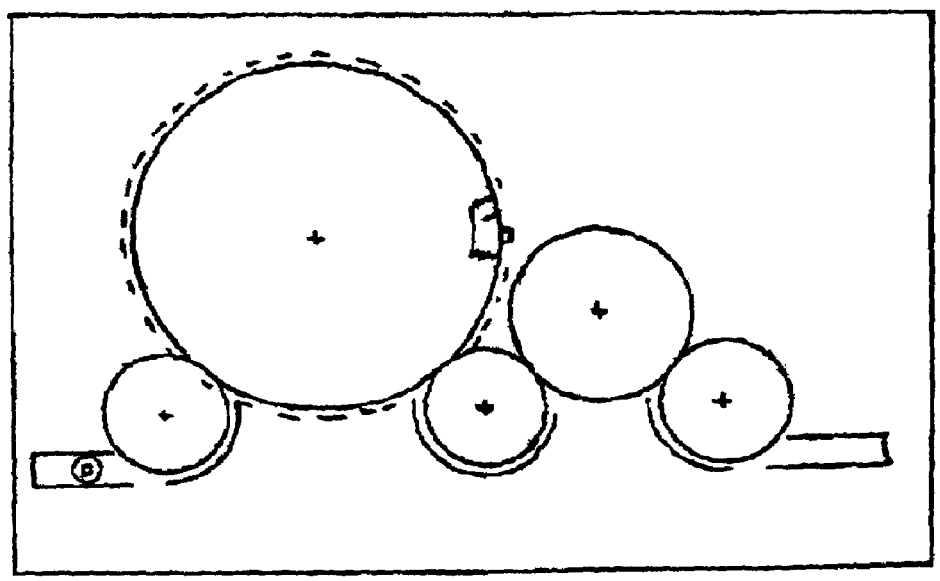
FIG. 1B shows a possible embodiment of a container handling machine with an aseptic filling system or a clean room, which aseptic filling system or clean room is represented by a box around the container handling machine.

FIG. 1B shows a possible embodiment of a container handling machine with an aseptic filling system or a clean room, which aseptic filling system or clean room is represented by a box around the container handling machine.

Figure 1C:
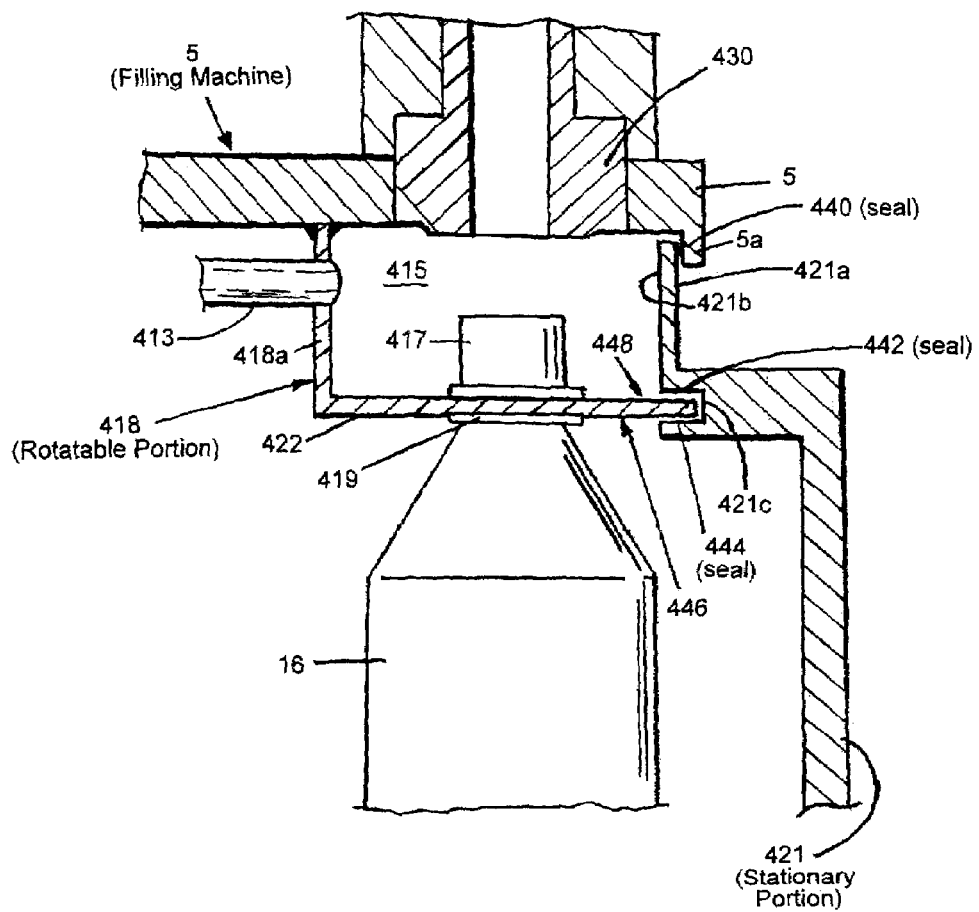
FIG. 1C is a detail illustration of an embodiment of the housing in the region of the filling machine.

FIG. 1C shows an example of an aseptic bottling system, which may possibly be utilized or adapted for use in one possible embodiment. In accordance with the embodiment that is illustrated in FIG. 1C, the clean chamber comprises a chamber, or a space, or a room 415 that surrounds only a portion of the beverage containers 16, namely, at least the mouth portions 417 thereof. Holders, supports and centering arrangements or centering devices 419 for the bottle mouths 417 are possibly directly disposed at the lower horizontal wall surface 418 that is rotating with the machine carousel. FIG. 1C illustrates in particular detail a seal arrangement 440 between surface 5a of a portion of filling machine 5 and surface 421a of stationary wall portion 421b. There may be provided similar seal arrangements 442 and 444 between the projecting portion of centering wall 422 and the groove 421c of the stationary wall 421. The centering wall 422 may comprise a slot, or slots, or similar openings 446 that may be covered by a cover, or covers, 448. Such covers 448 may possibly be actuated by cam arrangements configured and disposed to move the covers 448 to cover and uncover the slots or openings 446. Seals may be superfluous in at least one embodiment in which the disinfecting medium is introduced into chamber 415 with sufficient pressure to prevent ingress of microorganisms. The chamber 415 is generally configured by rotatable portions or components 418 and by stationary portions or components 421.

The conduit 413 is introduced, in one embodiment, through a vertical wall 418a that is part of the filling machine 5. FIG. 1C also indicates a filling valve 430, as is known in the art.

FIG. 1 shows in a greatly simplified overview two container handling machines which are connected to each other by infeed, discharge and transport starwheels, whereby all the illustrated components are part of the prior art.

Figure 2:
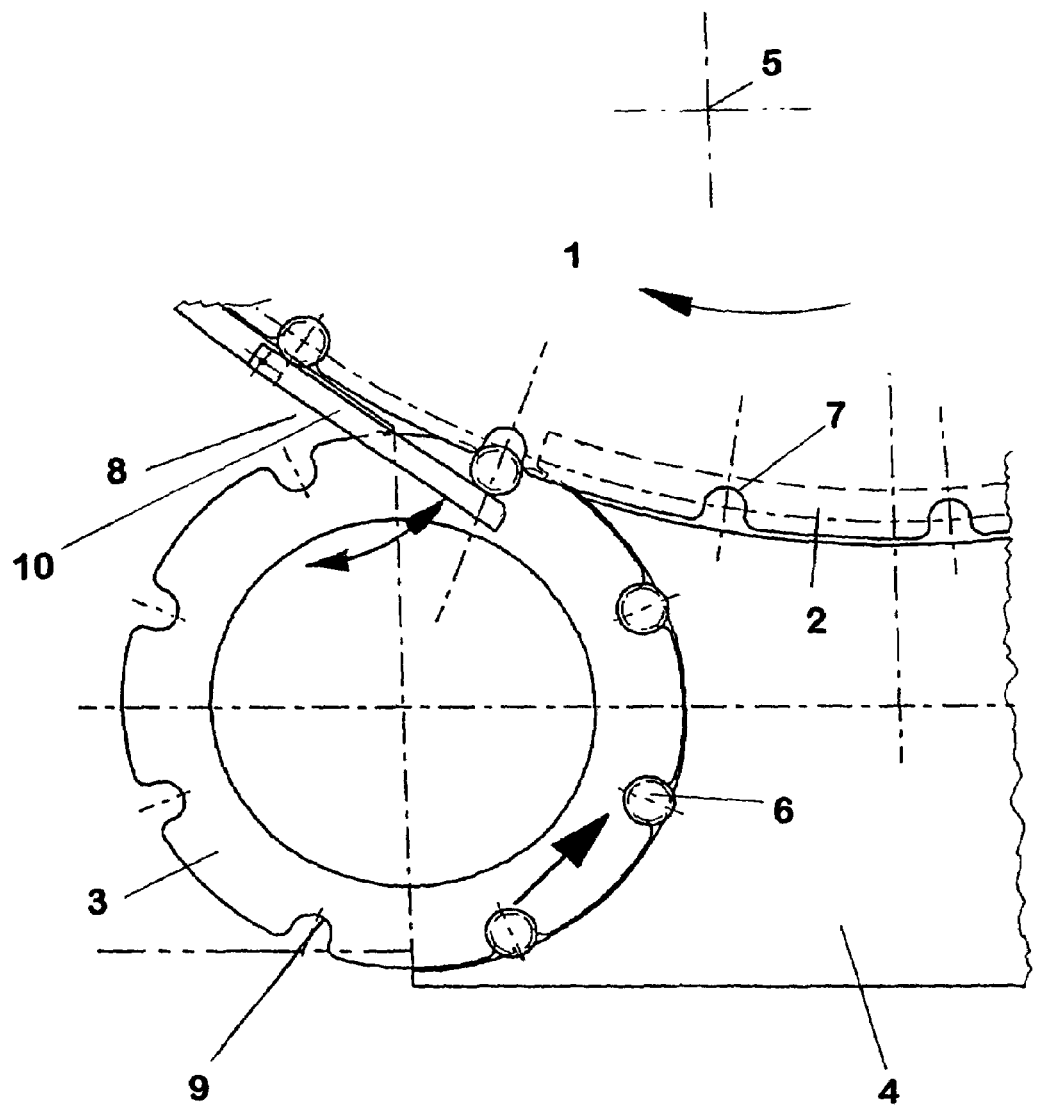
FIG. 2 is a simplified plan view of a transfer device as claimed in the present application, in the installed position.

FIG. 2 shows a segment of the circle of the carousel 2 of a container handling machine 1, whereby the machine in question can, for example, be a rinser or even a capper. The illustrated exemplary embodiment is a rotating type filling machine. The circulating portion of the filling machine, the carousel 2, can be rotated around the axis of rotation 5 of the machine.

By means of the infeed starwheel 3, which is equipped with starwheel pockets 9, the containers 6 are fed to the container handling machine 1, whereby an external guide 4 assists the guidance of the containers 6 at least for a determined distance.

To hold the containers 6 in the container handling machine 1, on the carousel 2 there are receiving pockets 7 into which the containers 6 are inserted by means of the transfer device 8.

For the insertion of the containers 6, the containers are first pushed toward the transfer device 8 by the continuously rotating infeed starwheel 3. Because the transfer device 8 is stationary and immobile, as the carousel 2 and infeed starwheel 3 advance, the containers 6 are pushed out of the starwheel pockets 9 and into the corresponding receiving pockets 7 of the carousel 2.

In other words, as the infeed starwheel 3 rotates and advances the bottles toward the carousel 2, the infeed starwheel eventually comes into contact with the transfer device 8. The transfer device 8 is disposed at such an angle with respect to the infeed starwheel 3 that it allows the bottle to slide along the length of the external guide 4, eventually forcing the bottle into the receiving pockets 7 of the carousel 2.

The transfer device 8 consists essentially of the transfer arm 10 which is fastened in a stationary position on the container handling machine or on its components or other components by means of a fastening device (not shown), i.e. so that it does not rotate with the carousel 2.

In one possible embodiment, the transfer arm 10 may be mounted in a stationary position on the starwheels 3 or carousels 2 of the container handling machine. In an alternate embodiment, the transfer arm 10 may be mounted on its own mounting device, separate from the starwheels 3, the carousels 2, or any other components of the container handling machine.

The transfer arm 10 is a single element that is constructed with a rigid material such as metal or plastic. The transfer arm 10 is rigid, that is, not able to bend or otherwise change shape so that it stays in a uniform, stationary position. Further, the transfer arm 10 comprises at least one part that is not moveable with respect to the other parts of the bottling machine.

Figure 4:
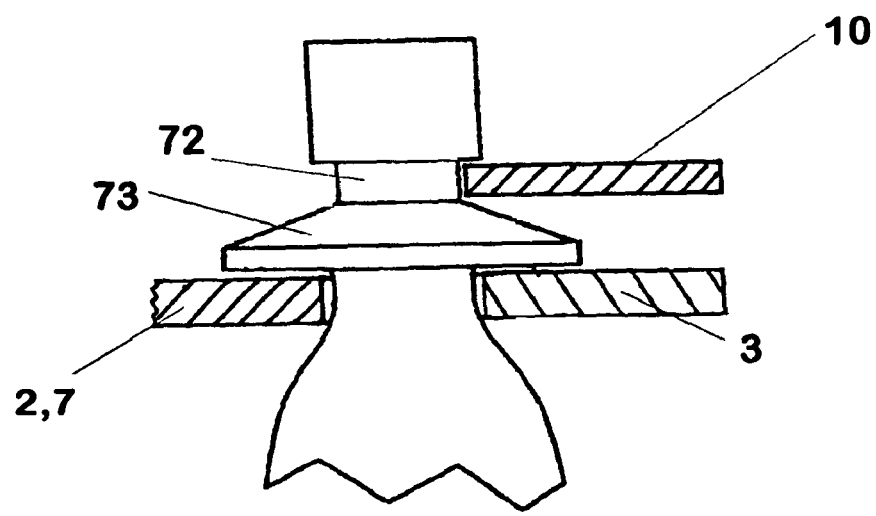
FIG. 4 shows an additional, simplified variant of the transfer arm 10.
Figure 3A:
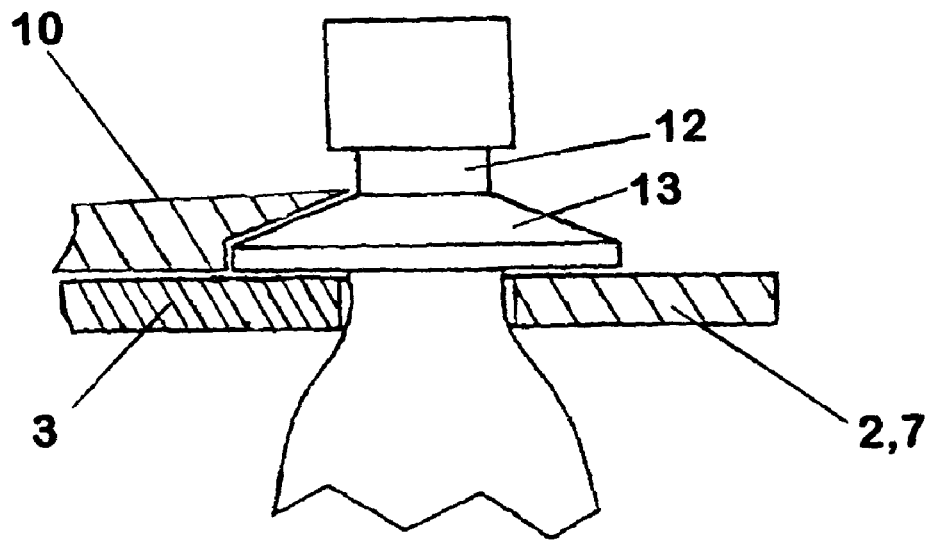
FIG. 3A shows another embodiment with a transfer arm adapted to the contour of only the neck ring.

There are essentially three possible configurations of the transfer arm 10. First this arm can be adapted in its geometric dimensions exclusively to the shape of the mouth extension 12 of the bottle that lies between the neck 13 and the threaded portion of the container, which results in particularly simple opportunities for the manufacture of the transfer arm 10. In this case, for example, the transfer arm 10 can be manufactured easily and economically from sheet metal, plastic or another suitable material. A configuration of this type is illustrated in FIG. 4 by way of example.

The transfer arm 10 can also be adapted exclusively to the contour or to the diameter of the neck ring 13.

Figure 3:
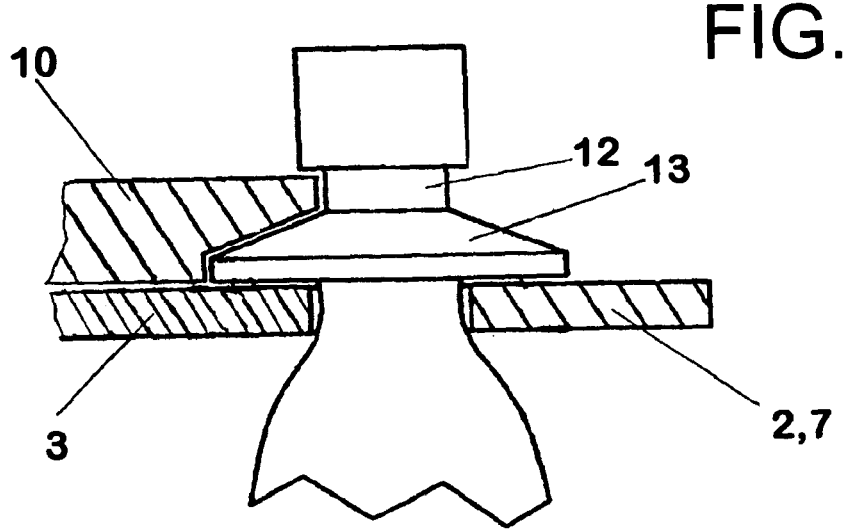
FIG. 3 shows an additional variant embodiment with a transfer arm 10 adapted to the contour of the neck ring 13 and the mouth extension 12.

As an improvement to the variant configurations described above, and as illustrated in FIG. 3, it is also possible to adapt the transfer arm 10 completely to the contour formed jointly by the neck ring 13 and the mouth extension 12 of the bottle. In this process, an improved guidance and transfer of the container between the infeed starwheel and carousel 2 or the receiving pockets 7 is achieved. In this variant it is appropriate to fabricate the transfer arm 10 not from a sheet metal material but from a suitable solid material made of metal or another material.

Because the contour formed by the neck ring 13 and/or the mouth extension 12 of the bottle, but also the contour or the diameter of the mouth extension 12 of the bottle can differ from one type of container to another, it is particularly advantageous at least to make it easy to replace or exchange the transfer arm 10.

It is also advantageous to provide a friction-reducing and/or wear-reducing coating on the surfaces and/or edges of the transfer arm 10 that come into contact with the moving containers 6. Appropriate coatings for this purpose include, for example, a hard chromium plating or a coating with tungsten carbide.

In an alternate embodiment, the transfer arm 10 could be covered with a removable sheath to prevent wear and also to keep the transfer arm 10 clean and free of dust. Such a sheath would also make cleaning the transfer arm 10 relatively easy.

In a variation of the essentially semi-circular realization of the starwheel pockets 9 and receiving pockets 7 illustrated in FIG. 2, to improve the movement and to simplify the transition of the containers 6, another, more advantageous contour of the pockets can be provided, without thereby going beyond the context of this application.

After the transfer of the containers 6 into the carousel 2, the stationary external guide 4 that also at least partly surrounds the carousel 2 assists in the guidance of the containers 6, whereby the external guide 4 can simultaneously form a portion of the lower enclosure of the clean room.

To adapt the transfer device 8 described here to different container neck or container ring neck diameters, the present application teaches that the transfer device 8 and/or the transfer arm 10 can be made adjustable.

In an additional and extremely advantageous realization of this application, the transfer device 8 and/or the transfer arm 10 also assists, accelerates and therefore optimizes the transfer process by active movements, as a result of which higher throughputs can be achieved.

For the realization of this function at least the transfer arm 10 can pivot, as a result of which the transfer arm transfers each container by an active movement from the starwheel pockets 9 into the receiving pockets 7.

Figure 5:
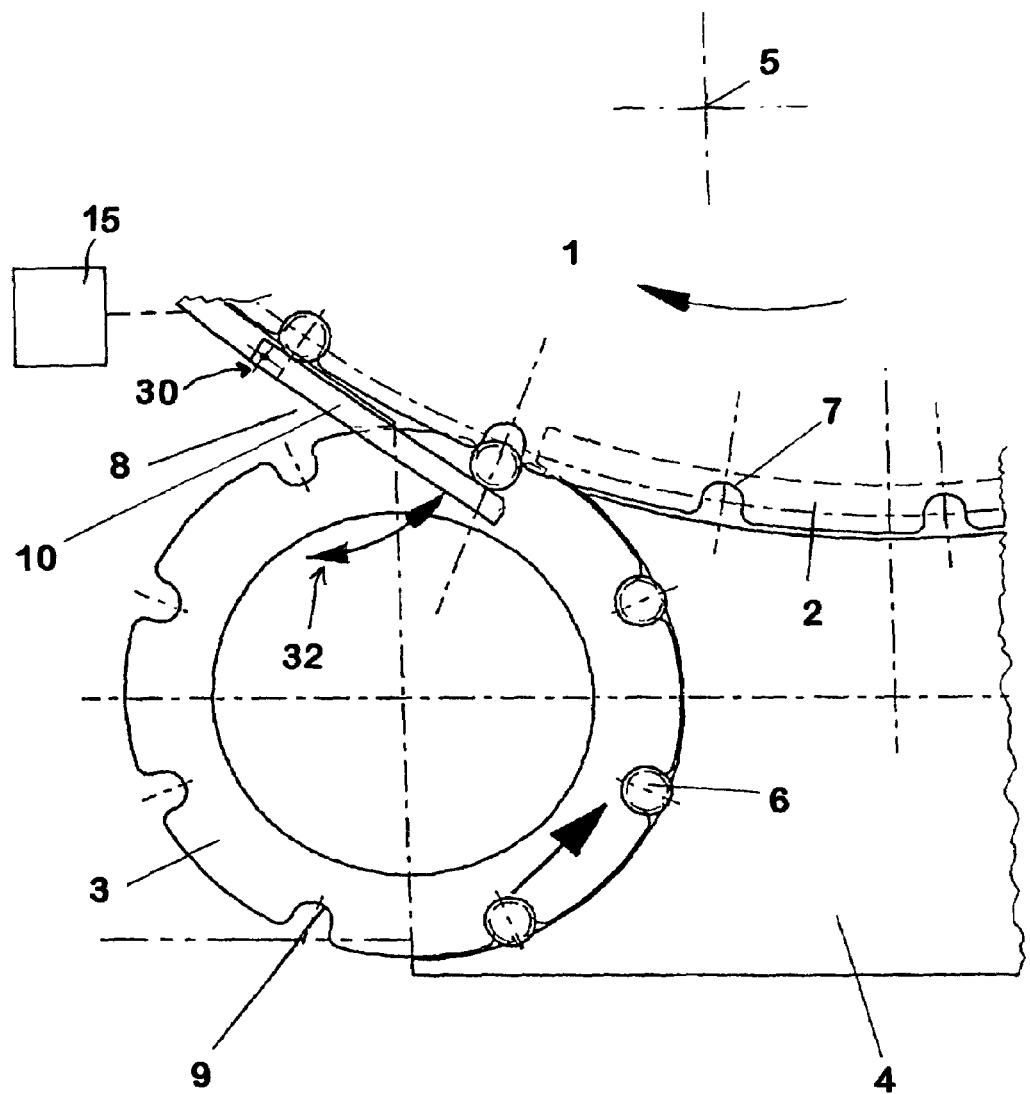
FIG. 5 shows a simplified plan view of an alternate embodiment of a transfer device with a drive system installed, indicated by a box.

FIG. 5 shows an alternate embodiment with a drive system 15, such as a hinge mechanism and a locking mechanism, installed for actively moving the transfer arm 10 in order to transfer each container from the starwheel pockets 9 into the receiving pockets 7. The drive system 15 causes the transfer arm 10 to pivot at a hinge or pivot structure 30 back and forth in the direction shown by double arrow 32 to actively push each container out of the starwheel pockets 9 and into the receiving pockets 7 as the starwheel rotates in the direction 33. The drive system 15 is configured to effect a controlled movement of the transfer arm 10 as would be desired.

All the drive systems disclosed by the prior art that are appropriate for this application can be used as the drive for this pivoting movement. Several appropriate types of drives are listed below by way of examples, and with no intention of limiting the scope of the present application: pneumatic cylinders, hydraulic cylinders, rotation and/or pivoting drive systems with an electrical, hydraulic or pneumatic drive, (electro-)magnets that act by attraction or repulsion, control cams located on the infeed starwheel, tensile and/or compression springs, including such springs used in connection with control cams.

No further description of the design or construction of a drive system for the pivoting movement is provided here, because the practical realization of a drive system of this type is not the object of this application.

In an additional realization of this application, the position and/or the size of the pivoting movement of the transfer arm 10 can be adjustable, so that the transfer device 8 can be adapted to different container dimensions. No further description of the design or construction measures required is given here, because the practical realization of such a device is likewise not the object of this application.

Another possible embodiment may be used in an aseptic bottling system or clean room. FIGS. 6, 6A, 7, and 7A show an embodiment used with an aseptic bottling system.

Figure 6:
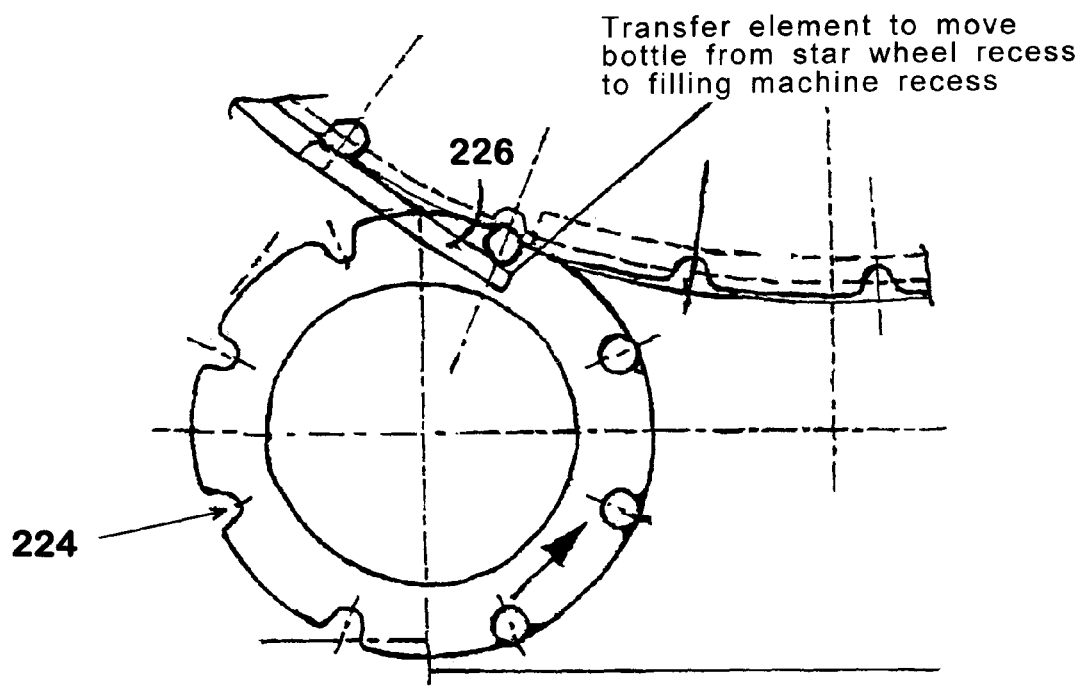
FIG. 6 illustrates a transfer arrangement for transferring bottles from the input star conveyer to the filling machine.
Figure 6A:
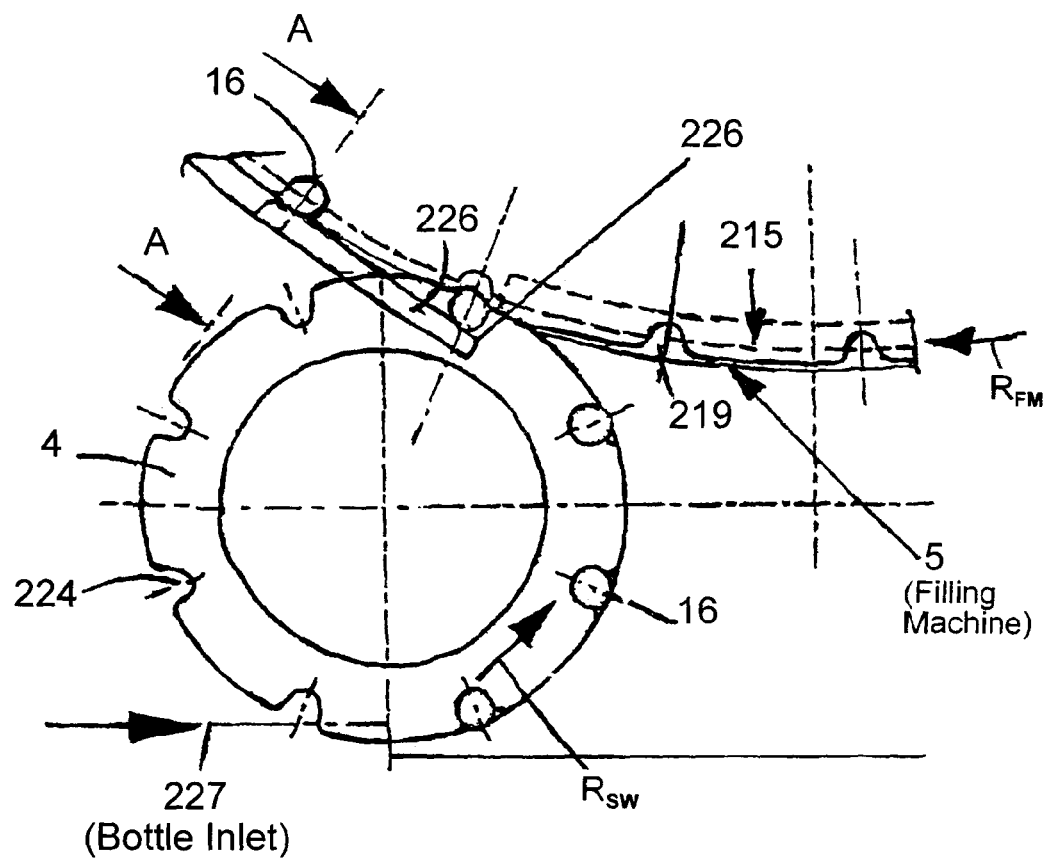
FIG. 6A is a view similar to FIG. 6 drawn to a larger scale and including identification of further detail.
Figure 7:
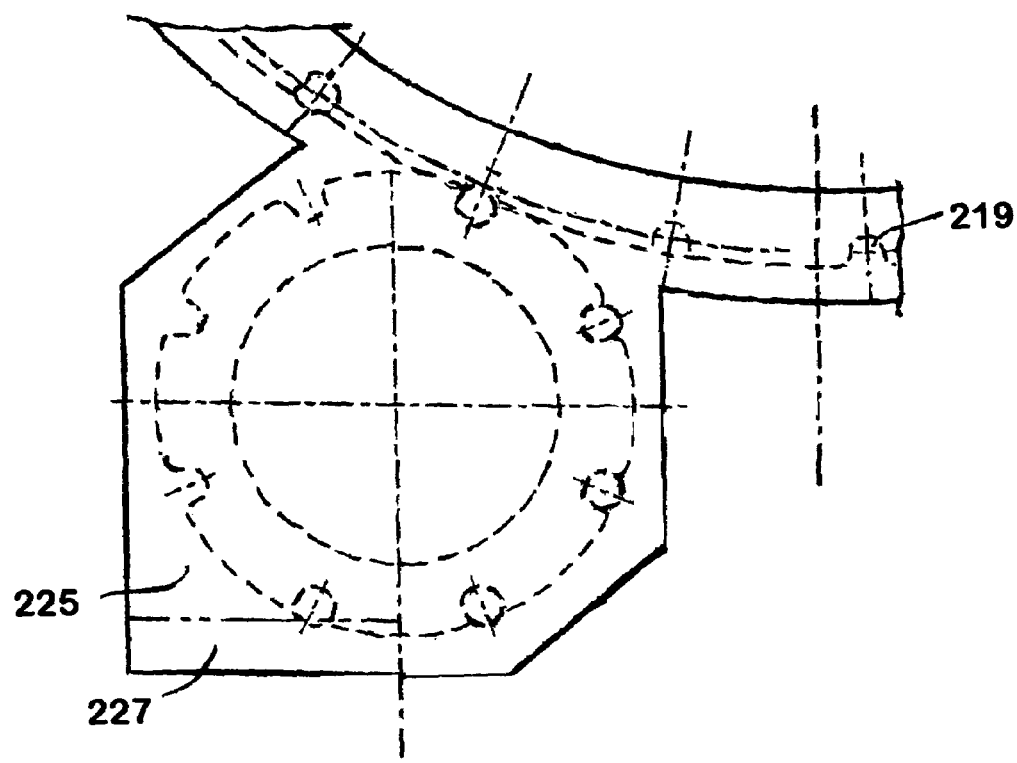
FIG. 7 is a top plan view of the enclosed region of an input star conveyer to feed bottles to the filling machine.
Figure 7A:
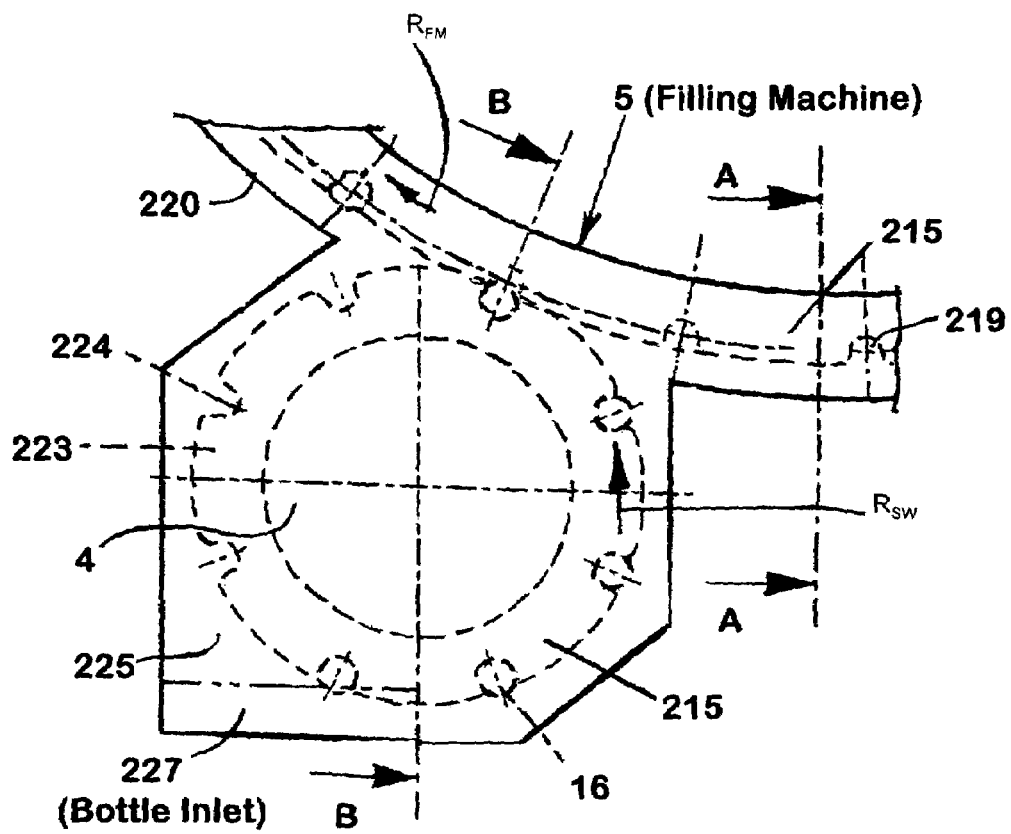
FIG. 7A is a view similar to FIG. 4 drawn to a larger scale.

In accordance with FIGS. 6 and 6A, and according to at least one possible embodiment, the container mouths may be introduced at a narrow entrance opening and exit opening 227 of the star pockets, or, respectively, the centering devices 224, or, respectively, removed from these upon completion of processing. For introduction of the sterile medium, inlets or nozzles can be provided at various locations, so as to maintain a rather constant and a rather all-pervasive low over-pressure in a clean chamber 215. However, it is within the scope of the various embodiments to carry out the introduction of the sterile medium at the container input side, whereby this sterile medium, or, respectively, a portion thereof, flows through the clean chamber 215 in the direction of rotation of the equipment while utilizing the rotational flow, compare arrow $R_{FM}$ and arrow $R_{SW}$, in FIGS. 7A and 6A.

In accordance with another possible embodiment, and in accordance with the embodiment of FIGS. 6, 6A, 7, and 7A, the starwheels are provided by a flat disc 223 with corresponding recesses, supports, and/or centering structures 224 to hold bottles 16. These discs are enveloped by a stationary upper hood component 225 whereby the rotating disc surface provides the lower limit of the chamber. For introduction and removal of the mouth in the transfer region of the filling machine 205, and the like equipment, there can be provided transfer devices 226, and the like transfer elements, or arrangements to move the bottle from the starwheel recess 224 to the filling machine recess 219, as is illustrated by way of an input embodiment in FIG. 7 and FIG. 7A.

One feature or aspect of an embodiment is believed at the time of the filing of this patent application to possibly reside broadly in a beverage bottling plant for filling bottles with a liquid beverage filling material, said beverage bottling plant comprising: a rotatable bottle cleaning station; a beverage filling machine; a bottle closing station; a bottle labeling station; said rotatable bottle cleaning station being configured to clean bottles comprising: a bottle cleaning station carousel configured to transport bottles; said beverage bottle cleaning station carousel having an axis disposed vertically about which vertical axis said bottle cleaning station carousel is rotatable; said bottle cleaning station carousel comprising receiving pockets for holding the necks of bottles; a bottle cleaning station transfer starwheel being configured to transport bottles into said rotatable cleaning station; said transfer starwheel having an axis disposed vertically about which vertical axis said bottle cleaning station transfer starwheel is rotatable; a bottle cleaning station transfer device comprising: a bottle cleaning station transfer arm that is rigid, non-articulatable, and non-bendable and that is disposed substantially between said bottle cleaning station transfer starwheel and said bottle cleaning station carousel; said bottle cleaning station transfer arm being configured and disposed to guide bottles from said bottle cleaning station transfer starwheel to said bottle cleaning station carousel; and said bottle cleaning station transfer arm being configured and disposed to make contact with the necks of bottles from said bottle cleaning station transfer starwheel upon the rotation of said bottle cleaning station transfer starwheel, and to guide the necks of bottles to slide the necks of the bottles along said transfer device and then guide the necks of bottles into the receiving pockets of said bottle cleaning station carousel; said beverage bottling plant for filling bottles with a liquid beverage filling material further comprising: a storage apparatus being configured and disposed to store a liquid beverage filling material; a rotatable beverage filling machine being configured and disposed to fill empty bottles with liquid beverage filling material; a conduit arrangement being configured and disposed to supply liquid beverage filling material from said storage apparatus to said beverage filling machine; said rotatable beverage filling machine also comprising a plurality of beverage filling stations, each beverage filling station comprising a beverage filling device for filling bottles with liquid beverage filling material; said filling devices comprising an apparatus being configured to introduce a predetermined volume of liquid beverage filling material into interiors of bottles to a substantially predetermined level of liquid beverage filling material and to terminate the filling of beverage bottles upon liquid beverage filling material reaching said substantially predetermined level in bottles; a beverage filling machine carousel configured to transport bottles; said beverage filling machine carousel having an axis disposed vertically about which vertical axis said beverage filling machine carousel is rotatable; said beverage filling machine carousel comprising receiving pockets for holding the necks of bottles; a beverage filling machine transfer starwheel configured to transport bottles into said beverage filling machine; said beverage filling machine transfer starwheel having an axis disposed vertically about which vertical axis said beverage filling machine transfer starwheel is rotatable; a beverage filling machine transfer device comprising: a beverage filling machine transfer arm that is rigid, non-articulatable, and non-bendable and that is disposed substantially between said beverage filling machine transfer starwheel and said beverage filling machine carousel; said beverage filling machine transfer arm being configured and disposed to guide bottles from said beverage filling machine transfer starwheel to said beverage filling machine carousel; and said beverage filling machine transfer arm being configured and disposed to make contact with the necks of bottles from said beverage filling machine transfer starwheel upon the rotation of said bottle filling machine transfer starwheel, and to guide the necks of bottles to slide the necks of the bottles along said transfer device and then guide the necks of bottles into the receiving pockets of said beverage filling machine bottle filling machine carousel; said beverage bottling plant for filling bottles with a liquid beverage filling material further comprising: a bottle closing station being configured and disposed to secure bottle caps to bottles to be closed and comprising: a bottle closing station carousel configured to transport bottles; said bottle closing station carousel having an axis disposed vertically about which vertical axis said bottle closing station carousel is rotatable; said closing station carousel comprising receiving pockets for holding the necks of bottles; a bottle closing station transfer starwheel configured to transport bottles into said closing station; said bottle closing station transfer starwheel having an axis disposed vertically about which vertical axis said bottle closing station transfer starwheel is rotatable; a transfer device comprising: a bottle closing station transfer arm that is rigid, non-articulatable, and non-bendable and that is disposed substantially between said bottle closing station transfer starwheel and said bottle closing station carousel; said bottle closing station transfer arm being configured and disposed to guide bottles from said bottle closing station transfer starwheel to said bottle closing station carousel; and said bottle closing station transfer arm being configured and disposed to make contact with the necks of bottles from said bottle closing station transfer starwheel upon the rotation of said bottle closing station transfer starwheel, and to guide the necks of bottles to slide the necks of the bottles along said transfer device and then guide the necks of bottles into the receiving pockets of said bottle closing station carousel; said beverage bottling plant for filling bottles with a liquid beverage filling material further comprising a bottle labeling station being configured and disposed to label closed, filled bottles comprising: a frame structure having an axis disposed vertically; a turntable structure being configured and disposed to rotate about said vertical axis of said frame structure, said turntable structure having a peripheral region; a drive arrangement being configured and disposed to rotate said turntable structure about said vertical axis of said frame structure; a plurality of support tables being configured to support and to rotate a bottle; said support tables being disposed at said peripheral region of said turntable structure; each support table having an axis disposed vertically about which vertical axis a support table is rotatable; each support table comprising a drive arrangement being configured and disposed to rotate its corresponding support table about its vertical support table axis, to permit rotation of a bottle supported on a support table; a labeling station transfer starwheel configured to transport bottles into said labeling station; said labeling station transfer starwheel having an axis disposed vertically about which vertical axis said labeling station transfer starwheel is rotatable; a labeling station transfer device comprising: a labeling station transfer arm that is rigid, non-articulatable, and non-bendable and that is disposed substantially between said labeling station transfer starwheel and said turntable structure; said labeling station transfer arm being configured and disposed to guide bottles from said labeling station transfer starwheel to said turntable structure; and said labeling station transfer arm being configured and disposed to make contact with the necks of bottles from said labeling station transfer starwheel upon the rotation of said labeling station transfer starwheel, and to guide the necks of bottles to slide the necks of the bottles along said transfer arm and then guide the necks of bottles into the receiving pockets of said at least one turntable structure.

A further feature or aspect of an embodiment is believed at the time of the filing of this patent application to possibly reside broadly in a transfer device, wherein said transfer device comprises an arrangement for permitting movement or controlled pivoting of said transfer arm.

Another feature or aspect of an embodiment is believed at the time of the filing of this patent application to possibly reside broadly in a transfer device, wherein said transfer arm has a contour, which contour can be adjusted for different diameters of mouth portions of bottles or different diameters of neck rings of bottles.

Still another feature or aspect of an embodiment is believed at the time of the filing of this patent application to possibly reside broadly in a transfer device, wherein said transfer device comprises an arrangement for adjusting the magnitude and/or position of the pivoting movement of said transfer arm.

Yet another feature or aspect of an embodiment is believed at the time of the filing of this patent application to possibly reside broadly in a transfer device, wherein said transfer device comprises a first contour, which first contour is shaped to complimentarily engage and guide the contour of mouth portions of bottles.

A further feature or aspect of an embodiment is believed at the time of the filing of this patent application to possibly reside broadly in a transfer device, wherein said transfer device comprises a second contour, which second contour is shaped to complimentarily engage and guide the contour of mouth portions of bottles and neck rings of bottles.

Another feature or aspect of an embodiment is believed at the time of the filing of this patent application to possibly reside broadly in a transfer device, wherein said transfer device comprises a second contour, which second contour is shaped to complimentarily engage and guide the contour of neck rings of bottles.

Yet another feature or aspect of an embodiment is believed at the time of the filing of this patent application to possibly reside broadly in a transfer device, wherein said transfer arm comprises an arrangement for reducing friction.

Still another feature or aspect of an embodiment is believed at the time of the filing of this patent application to possibly reside broadly in a transfer device, wherein said transfer arm comprises an arrangement for reducing wear of said transfer arm.

A further feature or aspect of an embodiment is believed at the time of the filing of this patent application to possibly reside broadly in a method of aseptically filling plastic bottles with neck guide rings with a liquid beverage filling material in a beverage bottling plant, which beverage bottling plant comprises at least one of: a bottle cleaning machine station; a beverage filling machine station; a bottle closing station; a bottle labeling station; at least one of said stations comprising a transfer device; said transfer device comprising a transfer arm being rigid and non-articulatable and being configured to minimize contamination of containers and beverage filling material being bottled by said beverage bottling plant; said transfer arm being configured and disposed to make contact with necks of bottles and to guide necks of bottles along said transfer device and into the corresponding station of said transfer device; said method comprising the steps of: guiding the top portions of bottles aseptically with said transfer arm by making contact with the top portions of bottles; and guiding the top portions of bottles aseptically along said transfer arm and into the corresponding station of said transfer arm.

Another feature or aspect of an embodiment is believed at the time of the filing of this patent application to possibly reside broadly in a transfer device, wherein: said transfer device comprises an arrangement for permitting movement or controlled pivoting of said transfer arm; said transfer arm has a contour, which contour can be adjusted for different diameters of mouth portions of bottles or different diameters of neck rings of bottles; said transfer device comprises an arrangement for adjusting the magnitude and/or position of the pivoting movement of said transfer arm; said transfer device comprises a first contour, which first contour is shaped to complimentarily engage and guide the contour of mouth portions of bottles; said transfer device comprises a second contour, which second contour is shaped to complimentarily engage and guide the contour of mouth portions of bottles and neck rings of bottles; said transfer device comprises a second contour, which second contour is shaped to complimentarily engage and guide the contour of neck rings of bottles; said transfer arm comprises an arrangement for reducing friction; and said transfer arm comprises an arrangement for reducing wear of said transfer arm.

Yet another feature or aspect of an embodiment is believed at the time of the filing of this patent application to possibly reside broadly in: In a beverage container filling plant for filling containers with a liquid beverage filling material, said beverage container filling plant comprising at least one of: a bottle cleaning station; a beverage filling machine station; a bottle closing station; a bottle labeling station; a transfer device in at least one of said stations: said transfer device comprising a transfer arm being rigid and non-articulatable; said transfer arm being configured and disposed to guide containers to its corresponding station; and said transfer arm being configured and disposed to make contact with the top portions of containers and to guide the top portions of containers along said transfer arm and into the corresponding station of said transfer arm.

A further feature or aspect of an embodiment is believed at the time of the filing of this patent application to possibly reside broadly in a transfer device, wherein said transfer device comprises an arrangement for permitting movement or controlled pivoting of said transfer arm.

Another feature or aspect of an embodiment is believed at the time of the filing of this patent application to possibly reside broadly in a transfer device, wherein said transfer arm has a contour, which contour can be adjusted for different diameters of mouth portions of bottles or different diameters of neck rings of bottles.

Yet another feature or aspect of an embodiment is believed at the time of the filing of this patent application to possibly reside broadly in a transfer device, wherein said transfer device comprises an arrangement for adjusting the magnitude and/or position of the pivoting movement of said transfer arm.

Still another feature or aspect of an embodiment is believed at the time of the filing of this patent application to possibly reside broadly in a transfer device, wherein said transfer device comprises a first contour, which first contour is shaped to complimentarily engage and guide the contour of mouth portions of bottles.

A further feature or aspect of an embodiment is believed at the time of the filing of this patent application to possibly reside broadly in a transfer device, wherein said transfer device comprises a second contour, which second contour is shaped to complimentarily engage and guide the contour of mouth portions of bottles and neck rings of bottles.

Another feature or aspect of an embodiment is believed at the time of the filing of this patent application to possibly reside broadly in a transfer device, wherein said transfer device comprises a second contour, which second contour is shaped to complimentarily engage and guide the contour of neck rings of bottles.

Yet another feature or aspect of an embodiment is believed at the time of the filing of this patent application to possibly reside broadly in a transfer device, wherein said transfer arm comprises an arrangement for reducing friction.

Still another feature or aspect of an embodiment is believed at the time of the filing of this patent application to possibly reside broadly in a transfer device, wherein said transfer arm comprises an arrangement for reducing wear of said transfer arm.

A further feature or aspect of an embodiment is believed at the time of the filing of this patent application to possibly reside broadly in a transfer device for container handling machines such as fillers, rinsers or cappers for the handling of containers with a neck ring, with a circulating carousel on which there are handling spaces for the container, with at least one infeed starwheel, characterized by the fact that the transfer device consists of a rigid transfer arm.

Another feature or aspect of an embodiment is believed at the time of the filing of this patent application to possibly reside broadly in a transfer device characterized by the fact that on the transfer device there are means that make possible and/or perform a controlled pivoting movement of the transfer arm.

Yet another feature or aspect of an embodiment is believed at the time of the filing of this patent application to possibly reside broadly in a transfer device characterized by the fact that the transfer arm can be adjusted for different diameters of the mouth extension of the bottle or different diameters of the neck ring.

Still another feature or aspect of an embodiment is believed at the time of the filing of this patent application to possibly reside broadly in a transfer device characterized by the fact that on the transfer device there are means that make it possible to adjust the size and/or position of the pivoting movement of the transfer arm.

Another feature or aspect of an embodiment is believed at the time of the filing of this patent application to possibly reside broadly in a transfer device characterized by the fact that the transfer arm is adapted to the contour of the mouth extension of the bottle.

A further feature or aspect of an embodiment is believed at the time of the filing of this patent application to possibly reside broadly in a transfer device characterized by the fact that the transfer arm is adjusted to the contour formed by the mouth extension of the bottle and neck ring.

Yet another feature or aspect of an embodiment is believed at the time of the filing of this patent application to possibly reside broadly in a transfer device characterized by the fact that the transfer arm is adjusted to the contour of the neck ring.

Still another feature or aspect of an embodiment is believed at the time of the filing of this patent application to possibly reside broadly in a transfer device characterized by the fact that the transfer arm is coated at least partly with friction-reducing means.

A further feature or aspect of an embodiment is believed at the time of the filing of this patent application to possibly reside broadly in a transfer device characterized by the fact that the transfer arm is coated at least partly with wear-reducing means.

Some examples of low friction coatings which may possibly be utilized or adapted for use in at least one possible embodiment may possibly be found in the following U.S. Pat. No. 6,551,718, entitled "Low friction coating;" U.S. Pat. No. 6,284,322, entitled "Low-friction coating composition;" U.S. Pat. No. 6,084,034, entitled "Functional coating for reducing friction;" U.S. Pat. No. 5,763,011, "Functional coating for reducing friction;" U.S. Pat. No. 5,674,951, entitled "Abrasion-resistant and low friction coating compositions;" U.S. Pat. No. 5,482,637, entitled "Anti-friction coating composition containing solid lubricants;" and U.S. Pat. No. 4,849,264, entitled "Friction reducing coating for metal surfaces." Another example of a low friction coating that could possibly be used in at least one possible embodiment is Teflon.

Some examples of bottling systems that may possibly be utilized or possibly adapted for use in at least one possible embodiment of the present application may possibly be found in the following U.S. patents, all assigned to the Assignee herein, namely: U.S. Pat. Nos. 4,911,285; 4,944,830; 4,950,350; 4,976,803; 4,981,547; 5,004,518; 5,017,261; 5,062,917; 5,062,918; 5,075,123; 5,078,826; 5,087,317; 5,110,402; 5,129,984; 5,167,755; 5,174,851; 5,185,053; 5,217,538; 5,227,005; 5,413,153; 5,558,138; 5,634,500; 5,713,403; 6,276,113; 6,213,169; 6,189,578; 6,192,946; 6,374,575; 6,365,054; 6,619,016; 6,474,368; 6,494,238; 6,470,922; and 6,463,964.

The components disclosed in the various publications, disclosed or incorporated by reference herein, may possibly be used in possible embodiments, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of stepping motors that may possibly be utilized or possibly adapted for use in at least one possible embodiment of the present application may possibly be found in the following U.S. Pat. No. 6,348,774 issued to Andersen et al. on Feb. 19, 2002; U.S. Pat. No. 6,373,209 issued to Gerber et al. on Apr. 16, 2002; U.S. Pat. No. 6,424,061 issued to Fukuda et al. on Jul. 23, 2002; U.S. Pat. No. 6,509,663 issued to Aoun on Jan. 21, 2003; U.S. Pat. No. 6,548,923 to Ohnishi et al. on Apr. 15, 2003; and U.S. Pat. No. 6,661,193 issued to Tsai on Dec. 9, 2003.

The appended drawings in their entirety, including all dimensions, proportions and/or shapes in at least one embodiment of the present application, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

Some examples of sensors that may possibly be utilized or possibly adapted for use in at least one possible embodiment of the present application may possibly be found in the following U.S. Pat. No. 6,062,248 issued to Boelkins on May 16, 2000; U.S. Pat. No. 6,223,593 issued to Kubisiak et al. on May 1, 2001; U.S. Pat. No. 6,466,035 issued to Nyfors et al. on Oct. 15, 2002; U.S. Pat. No. 6,584,851 issued to Yamagishi et al. on Jul. 1, 2003; U.S. Pat. No. 6,631,638 issued to James et al. on Oct. 14, 2003; and U.S. Pat. No. 6,707,307 issued to McFarlane et al. on Mar. 16, 2004.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Some examples of servo-motors that may possibly be utilized or possibly adapted for use in at least one possible embodiment of the present application may possibly be found in the following U.S. Pat. No. 4,050,434 issued to Zbikowski et al. on Sep. 27, 1977; U.S. Pat. No. 4,365,538 issued to Andoh on Dec. 28, 1982; U.S. Pat. No. 4,550,626 issued to Brouter on Nov. 5, 1985; U.S. Pat. No. 4,760,699 issued to Jacobsen et al. on Aug. 2, 1988; U.S. Pat. No. 5,076,568 issued to de Jong et al. on Dec. 31, 1991; and U.S. Pat. No. 6,025,684 issued to Yasui on Feb. 15, 2000.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

The corresponding foreign patent publication applications, namely, Federal Republic of Germany Patent Application No. 103 45 317.2, filed on Sep. 30, 2003, having inventor Volker Till, and DE-OS 103 45 317.2 and DE-PS 103 45 317.2, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Some examples of labeling machines which may possibly be utilized in at least one possible embodiment may possibly be found in the following U.S. Pat. No. 6,634,400, entitled "Labeling machine;" U.S. Pat. No. 6,561,246, entitled "Labeling machine capable of precise attachment of a label to different sizes of containers;" U.S. Pat. No. 6,550,512, entitled "Labeling machine capable of preventing erroneous attachment of labels on containers;" U.S. Pat. No. 6,543,514, entitled "In-line continuous feed sleeve labeling machine and method;" U.S. Pat. No. 6,378,587, entitled "Cylindrical container labeling machine;" U.S. Pat. No. 6,328,086, entitled "Labeling machine;" U.S. Pat. No. 6,315,021, entitled "Labeling machine;" U.S. Pat. No. 6,263,940, entitled "In-line continuous feed sleeve labeling machine and method;" U.S. Pat. No. 6,199,614, entitled "High speed labeling machine having a constant tension driving system;" U.S. Pat. No. 6,167,935, entitled "Labeling machine; U.S. Pat. No. 6,066,223, entitled "Labeling machine and method; U.S. Pat. No. 6,050,319, entitled "Non-round container labeling machine and method;" and U.S. Pat. No. 6,045,616, entitled "Adhesive station and labeling machine."

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

Some examples of bottling systems which may possibly be utilized or adapted for use in at least one possible embodiment may possibly be found in the following U.S. Pat. No. 6,684,602, entitled "Compact bottling machine;" U.S. Pat. No. 6,470,922, entitled "Bottling plant for bottling carbonated beverages;" U.S. Pat. No. 6,390,150, entitled "Drive for bottling machine;" U.S. Pat. No. 6,374,575, entitled "Bottling plant and method of operating a bottling plant;" U.S. Pat. No. 6,192,946, entitled "Bottling system;" U.S. Pat. No. 6,185,910, entitled "Method and an apparatus for high-purity bottling of beverages;" U.S. Pat. No. 6,058,985, entitled "Bottling machine with a set-up table and a set-up table for a bottling machine and a set-up table for a bottle handling machine;" U.S. Pat. No. 5,996,322, entitled "In-line bottling plant;" U.S. Pat. No. 5,896,899, entitled "Method and an apparatus for sterile bottling of beverages;" U.S. Pat. No. 5,848,515, entitled "Continuous-cycle sterile bottling plant;" U.S. Pat. No. 5,634,500, entitled "Method for bottling a liquid in bottles or similar containers;" and U.S. Pat. No. 5,425,402, entitled "Bottling system with mass filling and capping arrays."

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

Some examples of starwheels which may possibly be utilized or adapted for use in at least one possible embodiment may possibly be found in the following U.S. Pat. No. 5,613,593, entitled "Container handling starwheel;" U.S. Pat. No. 5,029,695, entitled "Improved starwheel;" U.S. Pat. No. 4,124,112, entitled "Odd-shaped container indexing starwheel;" and U.S. Pat. No. 4,084,686, entitled "Starwheel control in a system for conveying containers."

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments described herein above in the context of the preferred embodiments are not to be taken as limiting the embodiments to all of the provided details thereof, since modifications and variations thereof may be made without departing from the spirit and scope of the embodiments.

What is claimed is:

1. An aseptic bottle filling plant for aseptically cold filling bottles with a cold aseptic liquid beverage material, said aseptic bottle filling plant comprising:
    a plurality of aseptic bottle handling machines comprising at least an aseptic bottle rinsing machine, a rotary aseptic bottle filling machine, and a rotary aseptic bottle closing machine;
    a first at least one aseptic starwheel arrangement being configured and disposed to aseptically convey bottles to be rinsed to said aseptic bottle rinsing machine;
    said aseptic bottle rinsing machine being configured to aseptically rinse bottles;
    said aseptic bottle rinsing machine comprising:
        a conveyor arrangement being configured and disposed to convey bottles through said aseptic bottle rinsing machine;
        a rinsing arrangement being configured and disposed to aseptically rinse bottles being conveyed by said conveyor arrangement though said aseptic bottle rinsing machine;
        an aseptic bottle rinsing machine transfer device comprising:
            a pivotable aseptic bottle rinsing machine transfer arm that is disposed substantially between said first at least one starwheel arrangement and said conveyor arrangement;
            said aseptic bottle rinsing machine transfer arm being pivotably configured and disposed to aseptically guide bottles from said first at least one starwheel arrangement to said conveyor arrangement; and
            said aseptic bottle rinsing machine transfer arm being pivotably configured and disposed to aseptically make contact with a portion of the necks of bottles above a bottom surface of a neck ring of the necks of bottles from said first at least one starwheel arrangement, and to aseptically guide the necks of bottles to aseptically slide the necks of the bottles along said transfer device and then aseptically guide the necks of bottles to said conveyor arrangement;
    a second at least one aseptic starwheel arrangement being configured and disposed to convey bottles rinsed by said aseptic bottle rinsing machine to said aseptic bottle filling machine;
    said aseptic bottle filling machine being configured and disposed to aseptically fill bottles with an aseptic liquid beverage material upon bottles being aseptically rinsed by said aseptic bottle rinsing machine;
    said aseptic bottle filling machine comprising:
        a rotor;
        a rotatable vertical machine column;
        said rotor being connected to said vertical machine column to permit rotation of said rotor about said vertical machine column;
        a plurality of aseptic bottle filling elements for filling bottles with aseptic liquid beverage material being disposed on the periphery of said rotor;
        each of said plurality of bottle filling elements comprising a receiving pocket being configured and disposed to receive and hold beverage bottles to be aseptically filled;
        at least one liquid reservoir being configured to hold a supply of cold aseptic liquid beverage material;
        at least one supply line being configured and disposed to connect said at least one liquid reservoir to said plurality of bottle filling elements to supply aseptic liquid beverage material to said plurality of bottle filling elements;
        each of said plurality of bottle filling elements comprising an apparatus being configured to aseptically introduce a predetermined volume of cold aseptic liquid beverage filling material into interiors of bottles to a substantially predetermined level of cold aseptic liquid beverage filling material and to terminate the aseptic filling of beverage bottles upon cold aseptic liquid beverage filling material reaching said substantially predetermined level in bottles;
    an aseptic bottle filling machine transfer device comprising:

an aseptic bottle filling machine transfer arm that is rigid, non-articulatable, and non-bendable and that is disposed substantially between said second at least one starwheel arrangement and said aseptic bottle filling machine rotor;

said aseptic bottle filling machine transfer arm being configured and disposed to aseptically guide bottles from said second at least one starwheel arrangement to said aseptic bottle filling machine rotor; and said beverage aseptic bottle filling machine transfer arm being configured and disposed to aseptically make contact with a portion of the necks of bottles above a bottom surface of a neck ring of the necks of bottles from said second at least one starwheel arrangement upon the rotation of said second at least one starwheel arrangement, and to aseptically guide the necks of bottles to aseptically slide the necks of the bottles along said transfer device and then aseptically guide the necks of bottles into the receiving pockets of said aseptic bottle filling machine rotor;

a third at least one starwheel arrangement being configured and disposed to aseptically move bottles out of said aseptic bottle filling machine upon bottles being aseptically filled with a cold aseptic liquid beverage material;

said aseptic bottle closing machine being configured and disposed to aseptically close tops of filled bottles subsequent to bottles being aseptically filled with cold aseptic liquid beverage material;

said aseptic bottle closing machine comprising:
a rotor;
a rotatable vertical machine column;
said rotor being connected to said vertical machine column to permit rotation of said rotor about said vertical machine column;
a plurality of closing devices being disposed on the periphery of said rotor;
each of said plurality of closing devices being configured and disposed to aseptically place closures on filled bottles;
each of said plurality of closing devices comprising a receiving pocket being configured and disposed to aseptically receive and hold filled bottles;
an aseptic bottle closing machine transfer device comprising:
an aseptic bottle closing machine transfer arm that is rigid, non-articulatable, and non-bendable and that is disposed substantially between said third at least one starwheel arrangement and said aseptic bottle closing machine rotor;
said aseptic bottle closing machine transfer arm being configured and disposed to aseptically guide bottles from said third at least one starwheel arrangement to said aseptic bottle closing machine rotor; and
said beverage aseptic bottle closing machine transfer arm being configured and disposed to aseptically make contact with a portion of the necks of bottles above a bottom surface of a neck ring of the necks of bottles from said first closing machine conveyor device upon the rotation of said first closing machine conveyor device, and to aseptically guide the necks of bottles to aseptically slide the necks of the bottles along said transfer device and then aseptically guide the necks of bottles into the receiving pockets of said aseptic bottle closing machine rotor; and a fourth at least one starwheel arrangement being configured and disposed to move rinsed, filled, closed bottles out of said aseptic bottle closing machine upon bottles being closed.

2. The aseptic bottle filling plant according to claim 1, wherein each of said transfer arms comprises a contour, which contour is shaped to complimentarily engage a portion of the necks of bottles above a bottom surface of a neck ring of the necks of bottles to guide the necks of bottles.

3. The aseptic bottle filling plant according to claim 2, wherein said contour is shaped to complimentarily engage only a portion of the necks of bottles above a neck ring of the necks of bottles to guide the necks of bottles.

4. The aseptic bottle filling plant according to claim 3, wherein:
each of said transfer devices comprises a drive system; and
said drive system is connected to its corresponding transfer arm and configured to pivot its corresponding transfer arm.

5. The aseptic bottle filling plant according to claim 4, wherein:
each of said transfer arms is detachably connected to its corresponding drive system; and
each of said drive systems is configured and disposed to receive and detachably connect with another transfer arm having a different contour which is different than said contour of said transfer arm to permit handling of bottles having a complimentary, different contour.

6. The aseptic bottle filling plant according to claim 5, wherein each of said drive systems is configured and disposed to adjust the magnitude and/or position of the pivoting movement of said transfer arm.

7. The aseptic bottle filling plant according to claim 6, wherein each of said transfer arms is at least partly coated with a friction-reducing coating for reducing friction between each of said transfer arms and bottles being contacted thereby.

8. The aseptic bottle filling plant according to claim 7, wherein:
each of said transfer arms is at least partly coated with a wear-reducing coating for reducing wear of each of said transfer arms; and
said plurality of aseptic bottle handling machines further comprises a bottle labeling machine being configured and disposed to label bottles.

9. The aseptic bottle filling plant according to claim 2, wherein said contour is shaped to complimentarily engage only a neck ring of the necks of bottles to guide the necks of bottles.

10. The aseptic bottle filling plant according to claim 9, wherein:
each of said transfer devices comprises a drive system; and
said drive system is connected to its corresponding transfer arm and configured to move or controllably pivot its corresponding transfer arm.

11. The aseptic bottle filling plant according to claim 10, wherein:
each of said transfer arms is detachably connected to its corresponding drive system; and
each of said drive systems is configured and disposed to receive and detachably connect with another transfer arm having a different contour which is different than said contour of said transfer arm to permit handling of bottles having a complimentary, different contour.

12. The aseptic bottle filling plant according to claim 11, wherein each of said drive systems is configured and disposed to adjust the magnitude and/or position of the pivoting movement of said transfer arm.

13. The aseptic bottle filling plant according to claim 12, wherein each of said transfer arms is at least partly coated with a friction-reducing coating for reducing friction between each of said transfer arms and bottles being contacted thereby.

14. The aseptic bottle filling plant according to claim 13, wherein:
   each of said transfer arms is at least partly coated with a wear-reducing coating for reducing wear of each of said transfer arms; and
   said plurality of aseptic bottle handling machines further comprises a bottle labeling machine being configured and disposed to label bottles.

15. The aseptic bottle filling plant according to claim 2, wherein said contour is shaped to complimentarily engage both a neck ring and a portion above a neck ring of the necks of bottles to guide the necks of bottles.

16. The aseptic bottle filling plant according to claim 15, wherein:
   each of said transfer devices comprises a drive system; and
   said drive system is connected to its corresponding transfer arm and configured to move or controllably pivot its corresponding transfer arm.

17. The aseptic bottle filling plant according to claim 16, wherein:
   each of said transfer arms is detachably connected to its corresponding drive system; and
   each of said drive systems is configured and disposed to receive and detachably connect with another transfer arm having a different contour which is different than said contour of said transfer arm to permit handling of bottles having a complimentary, different contour.

18. The aseptic bottle filling plant according to claim 17, wherein each of said drive systems is configured and disposed to adjust the magnitude and/or position of the pivoting movement of said transfer arm.

19. The aseptic bottle filling plant according to claim 18, wherein each of said transfer arms is at least partly coated with a friction-reducing coating for reducing friction between each of said transfer arms and bottles being contacted thereby.

20. The aseptic bottle filling plant according to claim 19, wherein:
   each of said transfer arms is at least partly coated with a wear-reducing coating for reducing wear of each of said transfer arms; and
   said plurality of aseptic bottle handling machines further comprises a bottle labeling machine being configured and disposed to label bottles.

* * * * *